(12) United States Patent
Khan et al.

(10) Patent No.: US 8,406,917 B2
(45) Date of Patent: *Mar. 26, 2013

(54) SYSTEM AND METHOD FOR RANDOM MIXED PALLETIZING OF PRODUCTS

(76) Inventors: Salahuddin F. Khan, Manitou Beach, MI (US); Jeffrey A. Clark, Adrian, MI (US); Philip K. Ickes, Clinton, MI (US); Hans Peter Schuster, Kaufbeuren (DE); Mike A. Shaffer, Morenci, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/839,910

(22) Filed: Aug. 16, 2007

(65) Prior Publication Data

US 2008/0046116 A1 Feb. 21, 2008

Related U.S. Application Data

(60) Provisional application No. 60/837,958, filed on Aug. 16, 2006.

(51) Int. Cl.
*G06F 7/00* (2006.01)
(52) U.S. Cl. .................................................. 700/217
(58) Field of Classification Search .................. 700/230, 700/213, 215, 259, 305; 9/230, 213, 215, 9/259, 305
See application file for complete search history.

(56) References Cited

U.S. PATENT DOCUMENTS

| | | | | |
|---|---|---|---|---|
| 3,889,797 A * | 6/1975 | Naito et al. | ................ | 198/346.1 |
| 5,297,924 A | 3/1994 | Neri et al. | | |
| 5,501,571 A * | 3/1996 | Van Durrett et al. | ......... | 414/801 |
| 5,908,283 A * | 6/1999 | Huang et al. | .................. | 414/801 |
| 6,315,104 B1 * | 11/2001 | Ebert | ......................... | 198/460.1 |
| 7,184,855 B2 | 2/2007 | Stingel, III et al. | | |
| 7,210,280 B2 | 5/2007 | Cottone et al. | | |
| 7,221,998 B2 | 5/2007 | Brust et al. | | |
| 7,266,422 B1 | 9/2007 | DeMotte et al. | | |
| 2003/0034229 A1 * | 2/2003 | Fishaw et al. | ............ | 198/781.06 |
| 2004/0146380 A1 * | 7/2004 | Baker et al. | .................... | 414/273 |

OTHER PUBLICATIONS

International Search Report and Written Opinion of the International Searching Authority, International Application No. PCT/US2007/018067, mailed on Sep. 10, 2008.

* cited by examiner

*Primary Examiner* — Ramya Burgess
(74) *Attorney, Agent, or Firm* — R. William Graham

(57) ABSTRACT

A system and method of the present invention randomly mixes and palletizes various containers received from a conveyor. A control system received an order in advance to cooperate with an automatic storage and retrieval system to pick the containers, ordered by various customers, and to place them on a second conveyor. A robotic device, such as a robotic arm or a gantry system, selectively picks the containers from the second conveyor and places the containers on a pallet in a mixed fashion. The pallets are delivered to the respective customers.

5 Claims, 9 Drawing Sheets

SYSTEM AND METHOD FOR RANDOM MIXED PALLETIZING OF PRODUCTS

RELATED APPLICATIONS

This is a non-provisional application that claims priority to a provisional application Ser. No. 60/837,958 filed on Aug. 16, 2006 and incorporated by reference herein in its entirety.

FIELD OF THE INVENTION

The present invention relates to a material handling system and a method for handling a multitude of workpieces, and more particularly, relates to a method and apparatus for receiving packages of random size and stacking the packages upon a pallet.

BACKGROUND OF THE INVENTION

Various order packing methods and systems are currently used in a packaging industry worldwide. Plants and other manufacturing and assembly facilities manually build mixed pallets of multiple SKU's. This practice results in high labor cost, large floor space, increase of quantity issues, such as damaged products, order accuracy, low pallet density, thereby resulting in an unstable load. It is known to provide methods and apparatuses for stacking individual packages into one or more groups, in order that the groups of packages may be commonly transported to a remote location, such as, for example, distributions centers, supermarkets, gas stations, and the like.

The prior art systems and methods do not provide great flexibility and do not readily accommodate different sized packages on a pallet. Moreover, with conventional method and systems, it is difficult to customize orders. The prior art apparatuses, currently used in various plants, typically add cases to pallets by stacking additional cases directly on top of the cases already placed on the pallet, which results columns, spaced from one another, rather than layers of interlocking cases, which are unstable and easily collapsible during transportation to the remote location or between various location and will lead to significant problems associated with safety, material handling system efficiency, significant increases with respect to product delivery time and cost.

The prior art is replete with various devices and methods for handling workpieces, such as, for example, devices taught by the U.S. Pat. No. 7,184,855 to Stingel, III et al., U.S. Pat. No. 7,210,894 to Huang, et al.; U.S. Pat. No. 7,210,280 to Cottone et al.; U.S. Pat. No. 7,221,998 to Brust et al.; U.S. Pat. No. 5,175,692 to Mazouz. The U.S. Pat. No. 7,221,998 to Brust et al., for example, teaches a method of building pallets of cases within an automated material handling system wherein the cases are arranged and ordered for placement in a case by case fashion by a robot. The method determines pallet layers to be placed on the pallet and identifies cases for inclusion in the pallet. Using the case dimension information, the cases are classified into at least one group, wherein each group is defined by a height range such that cases classified within a group have a height within the height range associated with that group. The cases of one of the groups can be assigned to locations within a same pallet layer, wherein the pallet layer has an area within a predefined area range. This method is time consuming and do not improve flexibility and speed needed in modern palletizing applications.

The U.S. Pat. No. 5,175,692 to Mazouz, for example, teaches a method and apparatus for randomly arriving mixed size and content parcels where a circular "carousel"-type conveyor is used to accept packages and stacks them upon pallets. The method and apparatus use "voxels", which are of "unit length" to measure the parcels. The "largest common voxel" is determined for modeling purposes. This method is time consuming and do not improve flexibility and speed needed in modern palletizing applications.

There is a constant need in the area of a material handling art for an improved method and an automated system, which will randomly mixed containers of various kinds on a pallet in response to an individual order received from a customer.

There is also a constant need for an improved system and a method, which results in higher density as the containers are places on the pallet thereby creating a stable pallet.

Another constant need in the area of a material handling art is in improved methods and systems that is cost effective thereby providing perfect accuracy in identifying the condition of the containers, which results in elimination of returned goods located in the containers.

Although the aforementioned prior art patents present certain advantages over the manual palletizing, needs always exist for improvements over the prior art which provide improved accuracy and efficiency of pallet stacking, which is provided by the present invention. As such, the present invention is directed to solve one or more problems associated with the prior art systems and methods.

SUMMARY OF THE INVENTION

A system and a method of the present invention present an automated random mixed palletizing application to improve and update currently existing system and methods of manual palletizing to build pallets with containers, i.e. boxes or trays both circular and non-circular cross sections and various dimensions and shapes as ordered by customers. The system includes a controller, a bar code reader/scanner for scanning the labels of the containers to identify SKU and type of the product contained therein. At least one accumulation case conveyor is cooperable with the bar code reader and is designed for accumulating and reading the containers.

A vision system measures the length, width, and heights of the containers and also checks if any flaps of the container are open thereby avoiding loose products. A secondary accumulation conveyor accumulates and meters the containers and detects if the flaps of the containers are open. A check weigher of the inventive system checks weight of the containers to determine if any of the containers are broken or defective in any respect. At least one secondary accumulation conveyor (buffer) registers the container per zone and pushes the container to another conveyor, i.e. an assembly conveyor.

The assembly conveyor moves the containers selected by the system to be accessible to a robotic device, such as articulating or gantry robot, as required by the customer and based on type of the application, to be pick-up by the four or six axis end of arm robotic device and placed upon a selected pallet. Numerous other elements of the inventive system include and are not limited to a banding and or stretch wrapping system, which bands and or stretch wraps every layer of the containers resting upon the pallet as the pallet is loaded by the robotic device and/or a stretch wrapping device, which wraps every layer of the containers, already band, that rest upon the pallet as the pallet is loaded by the robotic device. In addition, the system is not limited and the integrated software can easily be integrated to the customers ware house management or business data acquisition. For example: send data to a printer and provide a license plate to be placed on the pallet, inventory control and other functional process requirements.

As the customer supplies order information, such as quantity and type of the products, this information is stored in a RoboticStar® cell operatively communicated with the control system. An empty pallet is dispensed by a pallet dispenser and transferred through pallet load conveyors or into a automatic palletizing tower. The empty pallet positioned in front of the robot or in case of the tower configuration the empty pallet is elevated upwards and orientated in front of the inventive system ready to receive the containers. The containers may be supplied in a random mode and/or a selected mode once passed the inspection zone, stored in the buffer zone and then pushed through as per the selection onto the conveyance system diverting into several conveyor lanes, i.e. the accumulation case conveyors. The bar code reader, which is mounted on the accumulation case conveyor, reads, checks, and where necessary, rejects non-conformed containers and the containers having the bar code, which the bar code reader failed to read and/or scan.

The conforming containers are conveyed to an assembly area. The check system checks the top and bottom of the containers as they are conveyed therethrough. The check system checks the containers for inconsistency of any major flaps detected lower than ¼ by photo eyes. The check system also checks for any inconsistency of top "open" case flaps and case detection thereby identifying leaking and broken containers, by means of weight detection, performed at the check system. All inconsistent containers are rejected to the separate adjacent conveyor and or are divereted to the discharge continues conveyor.

The conforming containers are then conveyed toward the buffer indexing case conveyor or assembly conveyor located adjacent the robotic device. The containers are then picked up by the robotic device in either selected or random fashion from the assembly conveyor. The containers are then placed onto the target pallet as per program demand and calculated pattern. Once the order pallet height is reached or order is complete, the pallet is banded and or wrapped and labeled before the pallet leaves to the customer.

An advantage of the present invention is to provide a method and a system for an automated random mixed palletizing based on individual order received from a customer integrated to their ware house management system.

Another advantage of the present invention is to provide a method and a system that require smaller foot print, increase through put of the palletizing applications.

Still another advantage of the present invention is to provide a method of palletizing which results in higher density as the containers are places on the pallet thereby creating a stable pallet.

Still another advantage of the present invention is to provide a system and a method of palletizing the containers that is cost effective in inventory tracking with perfect accuracy resulting in elimination of returned goods.

Still another advantage of the present invention is to provide a system and a method of palletizing the containers that build pallets per route requirements on to the truck per the truck route.

Still another advantage of the present invention is to provide a system and a method of palletizing the containers integrated to automatically collect, store and process valuable data.

The collected data is used to provide automatically licensed plates to be placed on the build pallet for tracking, inventory control and other utilization for business management with the integration to the customers ware house management system.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 12:
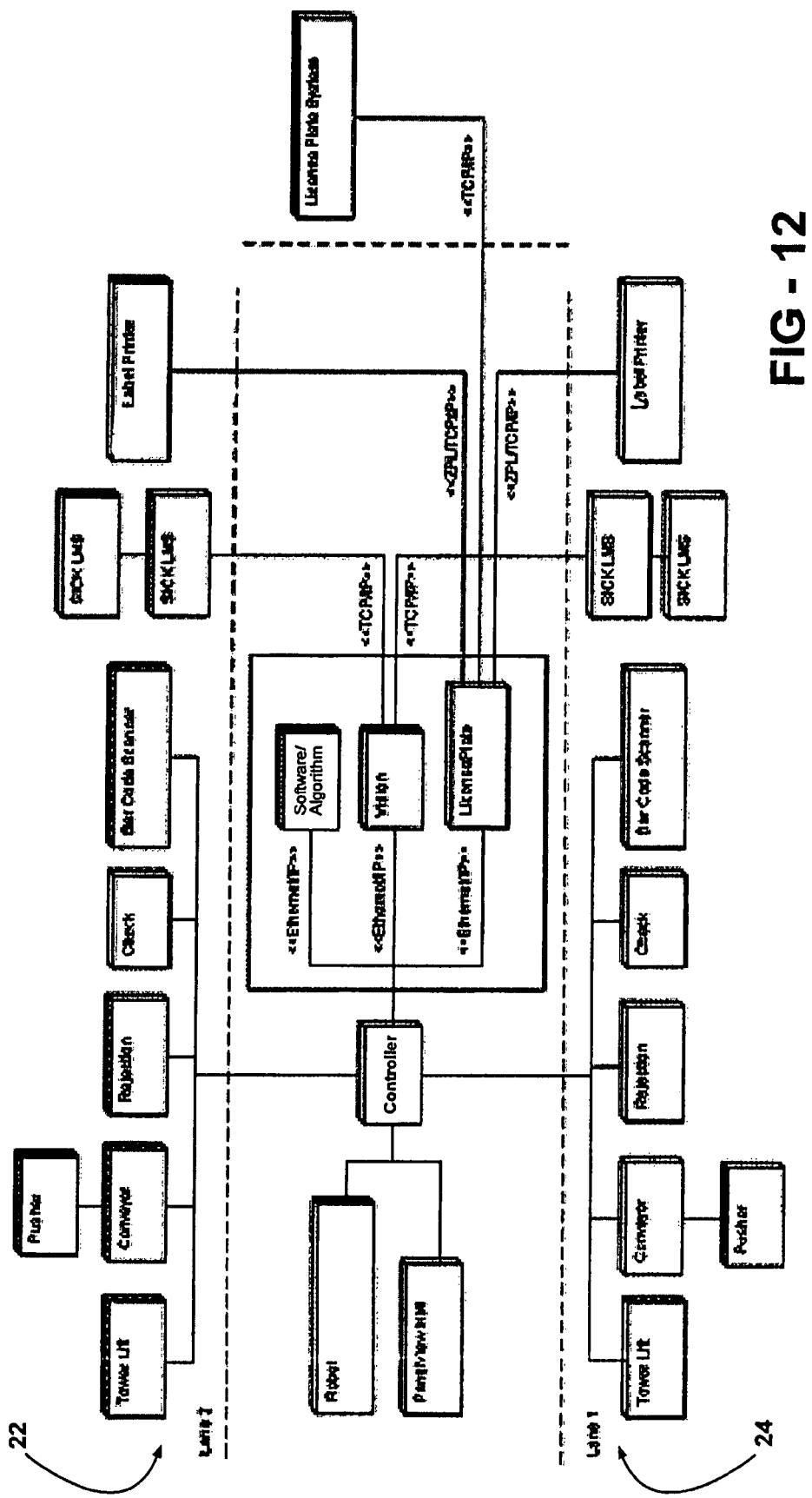
FIGS. 12 and 13 show flow chart of the present invention and detailed sequence of the operational steps of the inventive system.
Figure 13:
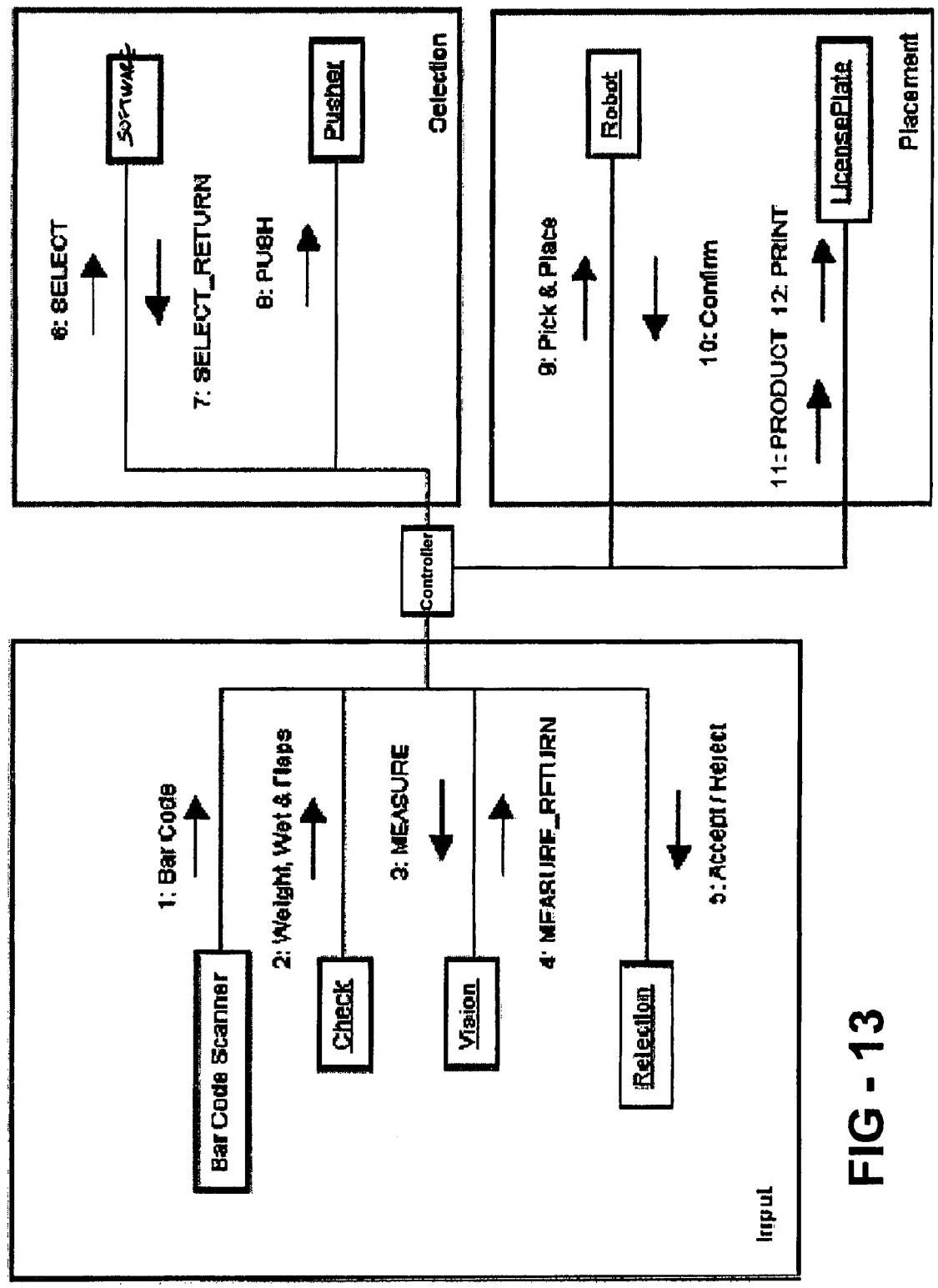

Referring to the Figures, wherein like numerals indicate like or corresponding parts, a system of the present invention is generally shown at 10. FIGS. 12 and 13 illustrate the flow chart of method of the inventive system 10. The system 10 presents an automated random mixed palletizing application to improve and update currently existing system and methods of manual palletizing to build pallets with containers 12, i.e. boxes, both circular and non-circular cross sections and various dimensions and shapes as ordered by customers. Those skilled in the art will appreciate that the container 12 presents a box, a bin, a tray of various kinds without limiting the scope of the present invention. The system 10 is configured to accommodate various palletizing applications such as randomly receiving multiple containers 12 from at least one conveyor and palletizing the containers 12 upon various pallets 14 and selectively picking the containers 12 from one pallet 14 and either placing the containers 12 upon the at least one conveyor and or upon another pallet 14 thereby building a customized pallet with mixed containers 12 of various configurations, dimensions and product contents.

The system 10 includes a control system or controller 18, a bar code reader/scanner 20 for scanning the labels of the containers to identify SKU and type of the product contained therein. The control system or controller 18 and the bar code reader/scanner 20 are shown schematically in FIG. 1 and are operatively communicated with a pair accumulation case conveyors are generally indicated at 22 and 24 and each defining a respective accumulation path A. The accumulation case conveyors 22 and 24 are roller type conveyors as known to those skilled in the conveyor art. Alternatively, the accumulation case conveyors 22 and 24 may present other modifications such as belt conveyors without limiting the scope of the present invention. The accumulation case conveyors 22 and 24 are mechanically and/or electrically powered without limiting the scope of the present invention.

Figure 1:
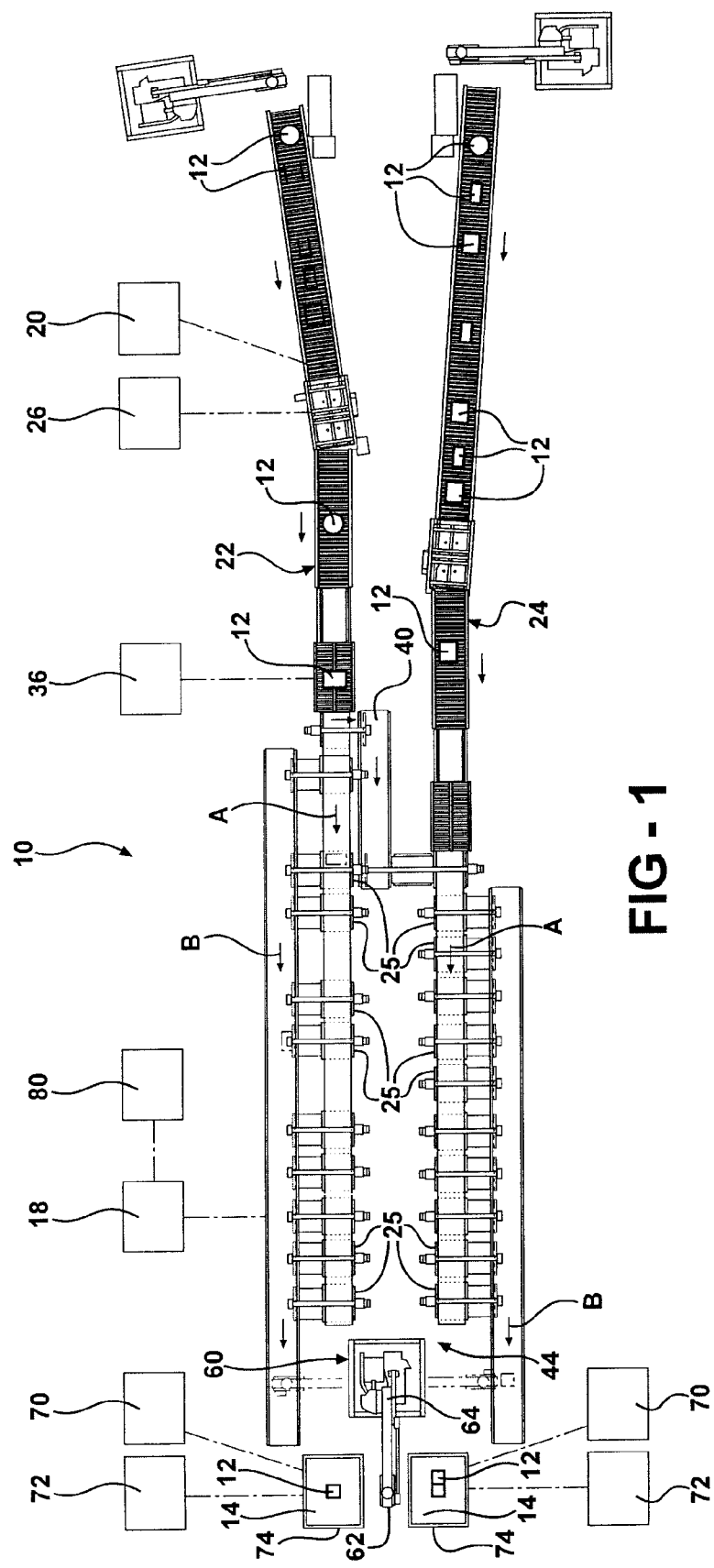
FIG. 1 is a general view of an inventive system.
Figure 6:
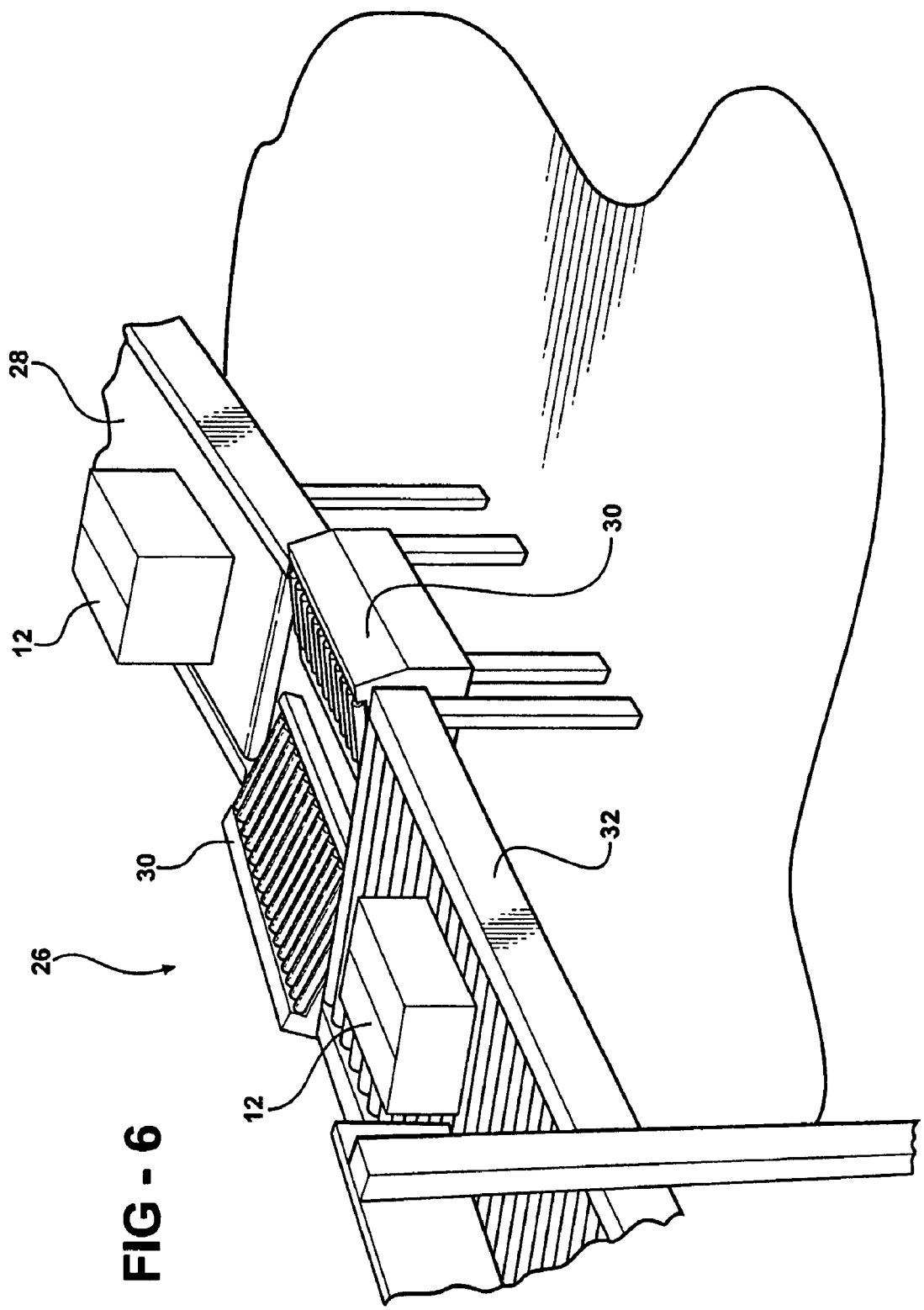
FIG. 6 is a fragmental perspective view of a checking system incorporated with the accumulating conveyor and adaptable to detect if the container is open, i.e. non-conforming.
Figure 7:
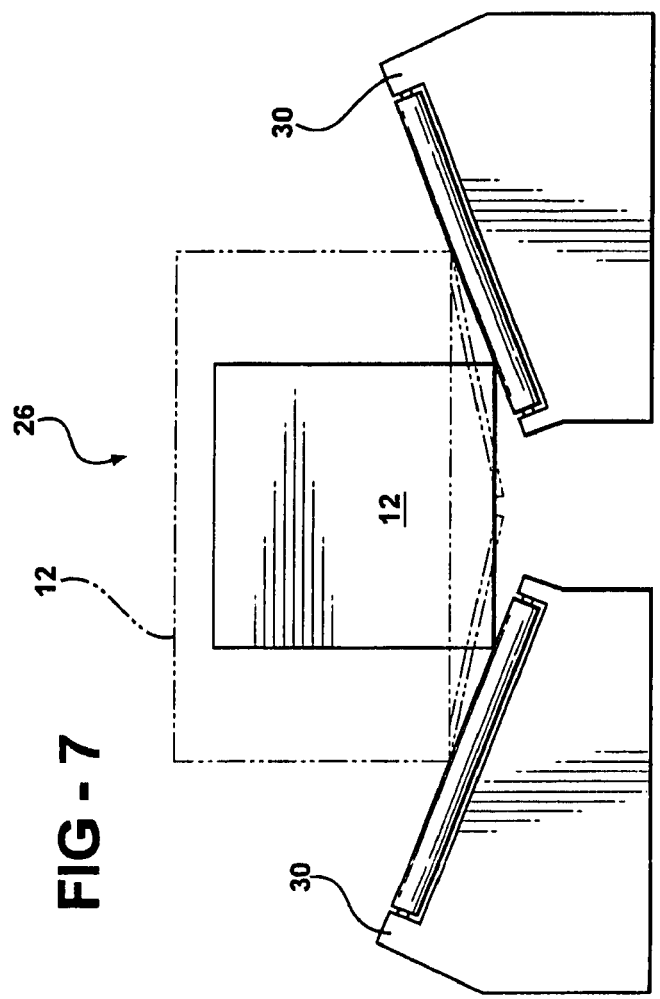
FIG. 7 is a cross sectional view of the checking system shown in FIG. 6.

A vision system 26 is operatively communicated with the control system or controller 18 and the bar code reader/scanner 20 and is shown generally in FIG. 1. FIGS. 6 and 7 show a fragmental and cross sectional view of the vision system 26. The vision system 26 measures length, width, and heights of the containers 12 and also checks if any flaps of the container 12 are open, as shown in phantom in FIG. 7, thereby avoiding loose and/or non-conforming products. The vision system 26 included a belt conveyor element 28, a pair of inclined conveyors 30 spaced from one another to free the bottom of the container 12 and a receiving conveyor element 32, all of which are integral with the at least one of the accumulation case conveyors 22 and 24.

Figure 2:
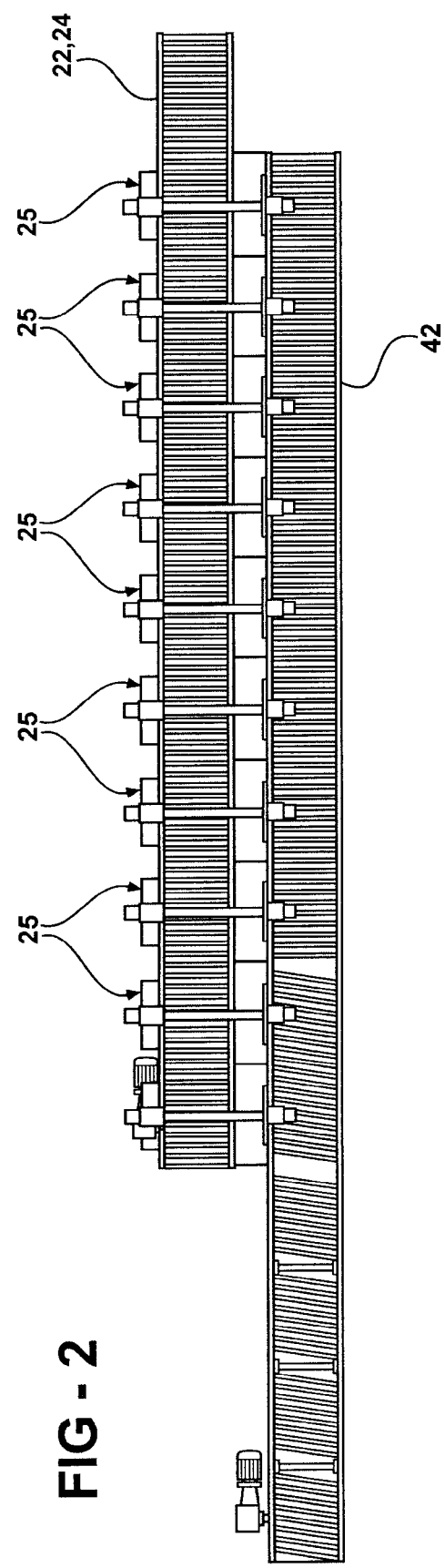
FIG. 2 is a partial and a top view of an accumulation conveyor cooperable with an assembly conveyor.
Figure 3:
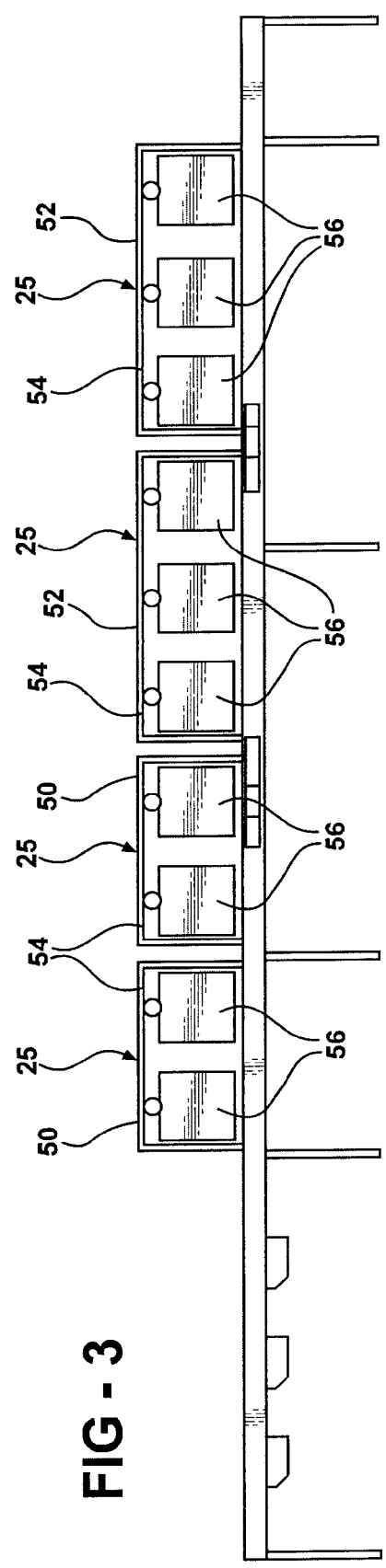
FIG. 3 is a side view of FIG. 2.

Alluding to the above, a check weigher 36 of the inventive system 10 is shown generally in FIG. 1. The check weigher 36 checks weight of the containers 12 to determine if any of the containers 12 are broken or defective in any respect. As accumulation case conveyors 22 and 24 accumulate and meter the containers 12 and detects if the flaps of the containers 12 are open, one or both conveyors 22 and 24 registers the containers 12 per at least one zone, all generally indicated at 25 in FIGS. 2 and 3, and pushes the defective or non-conforming containers 12 to another conveyor 40 as the application requires to be removed therefrom by robotically or manually.

The vision system 26, the control system or controller 18, the bar code reader/scanner 20, the vision system 26, the check weigher 36 will be discussed in details as the description of the present system 10 and the respective method of the automated palletizing of the containers 12 on the pallet 14 will proceed. The accumulation conveyor 22 and 24 moves the containers selected by the system to at least one pick-up load conveyor or an assembly conveyor, generally indicated at 42, each defining a respective palletizing or assembly path B. Each conveyor 42 extends to a palletizing zone, generally indicated at 44. The assembly conveyors 42 are roller type conveyors as known to those skilled in the conveyor art. Alternatively, the assembly conveyors 42 may present other modifications such as belt conveyors without limiting the scope of the present invention. The assembly conveyors 42 are mechanically and/or electrically powered without limiting the scope of the present invention. All of the aforementioned components of the present invention are integrated into the system 10 and located within the palletizing zone 44. Alternatively, any of the aforementioned components may be positioned, based on application and customer's need, beyond the palletizing zone 44, without limiting the scope of the present invention.

Figure 4:
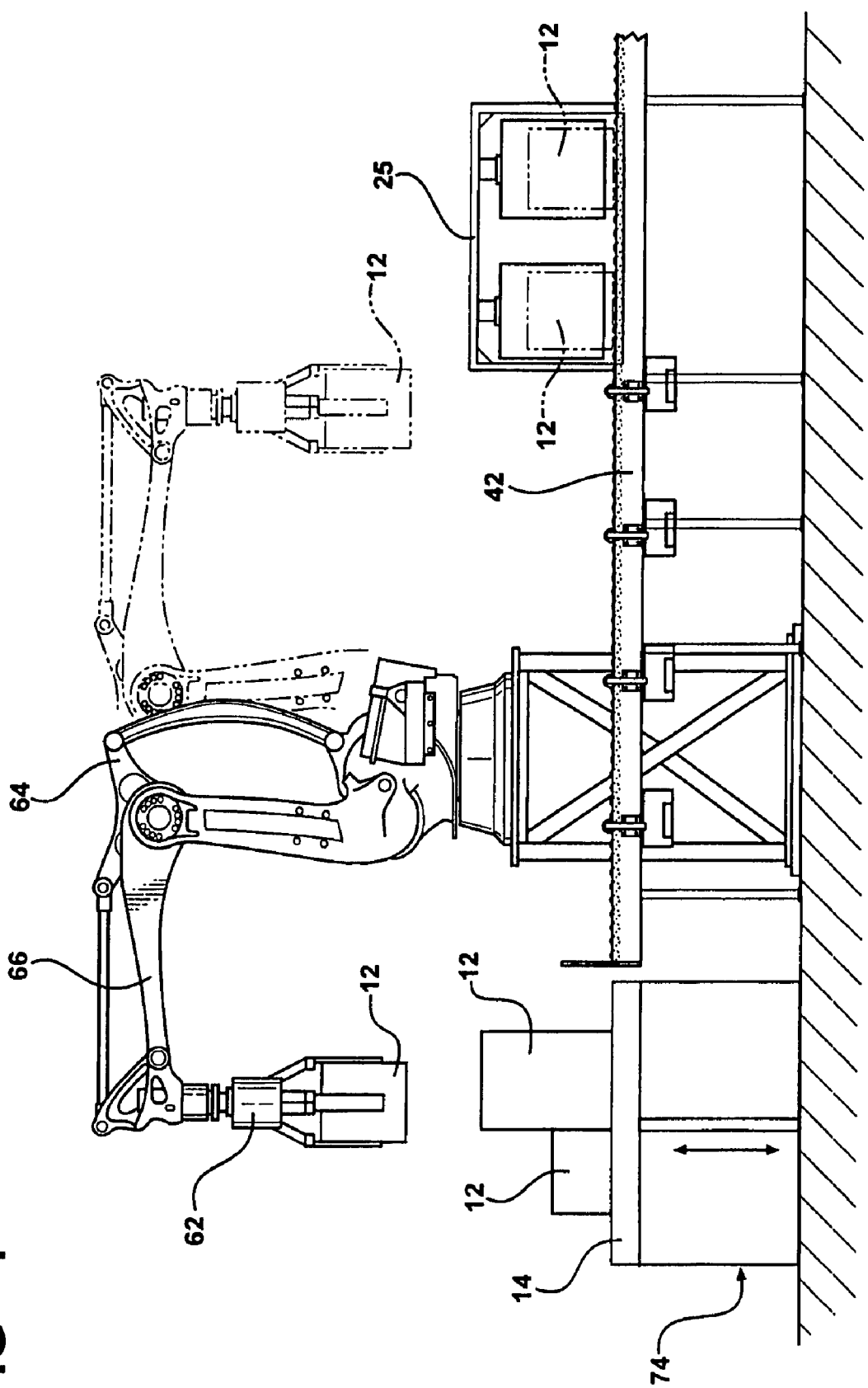
FIG. 4 is a fragmental side view of a robotic device movable from the assembly conveyor to a palletizing location for moving the containers from the assembly conveyor to be palletized at a pallet.
Figure 5:
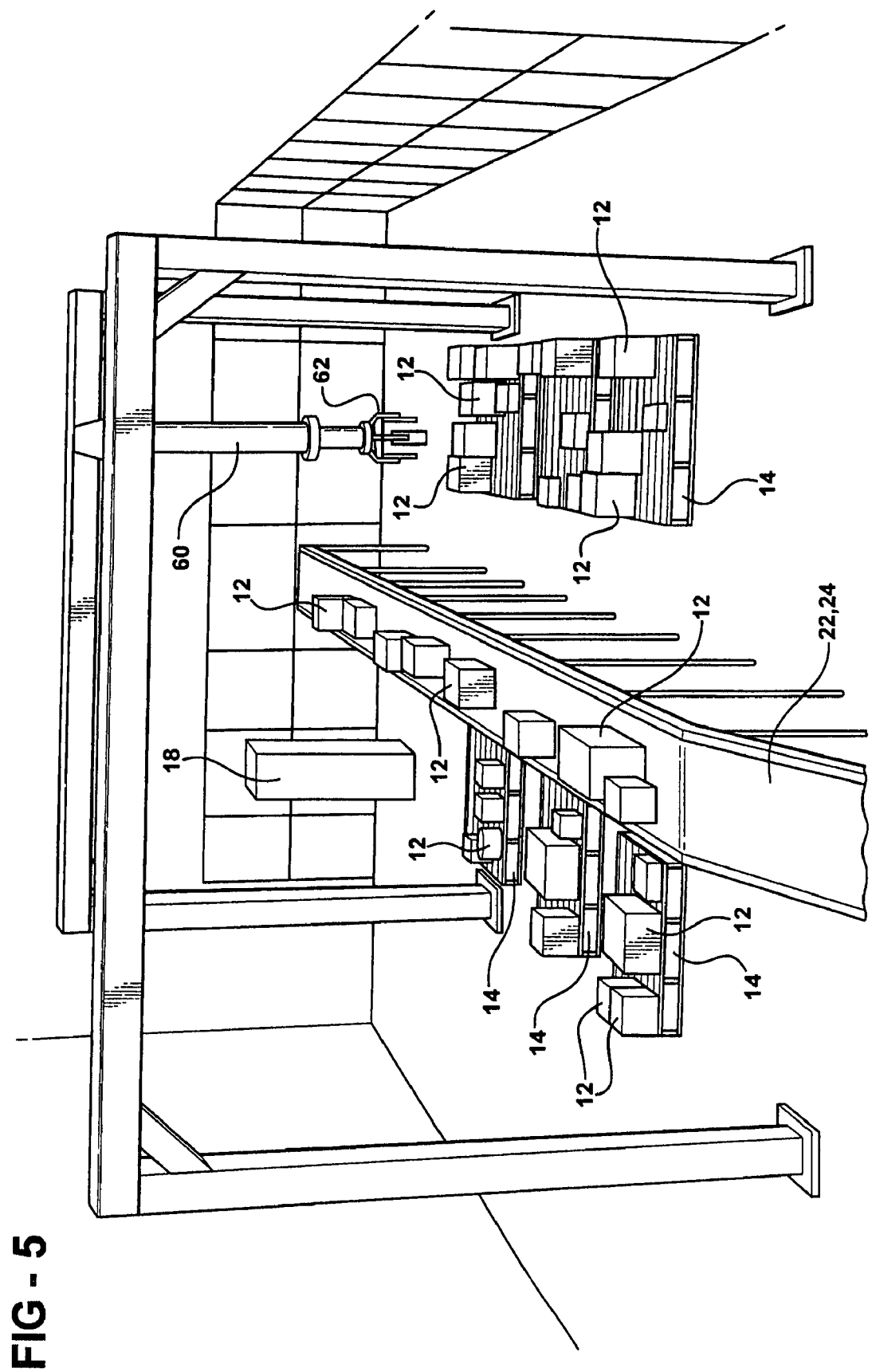
FIG. 5 is an environmental view of an alternative embodiment of the system.
Figure 8:
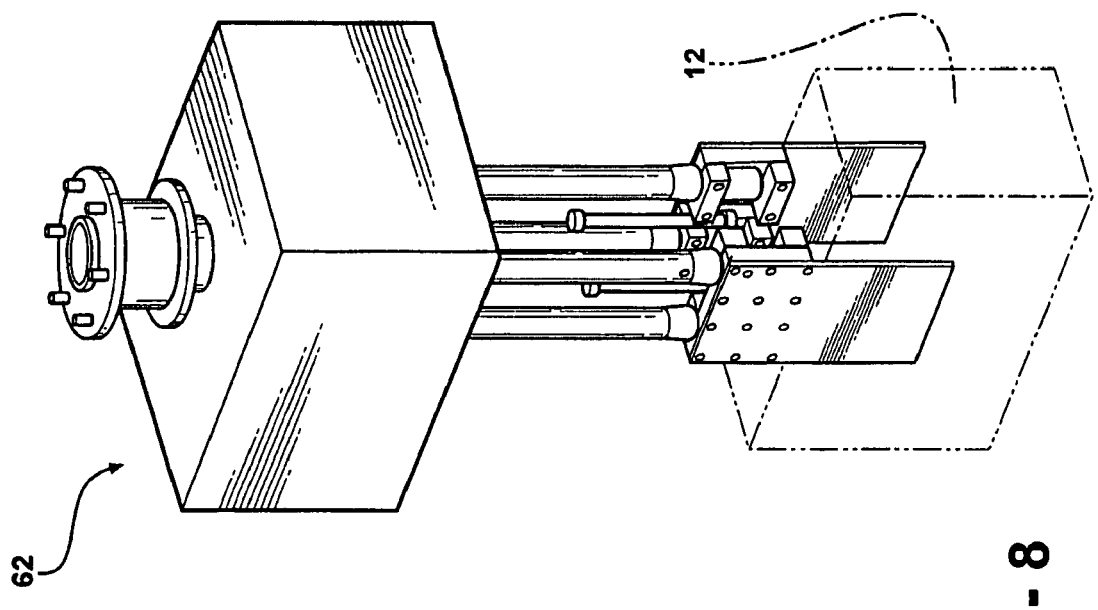
FIG. 8 is a fragmental view of a gripper of a robotic device.
Figure 9:
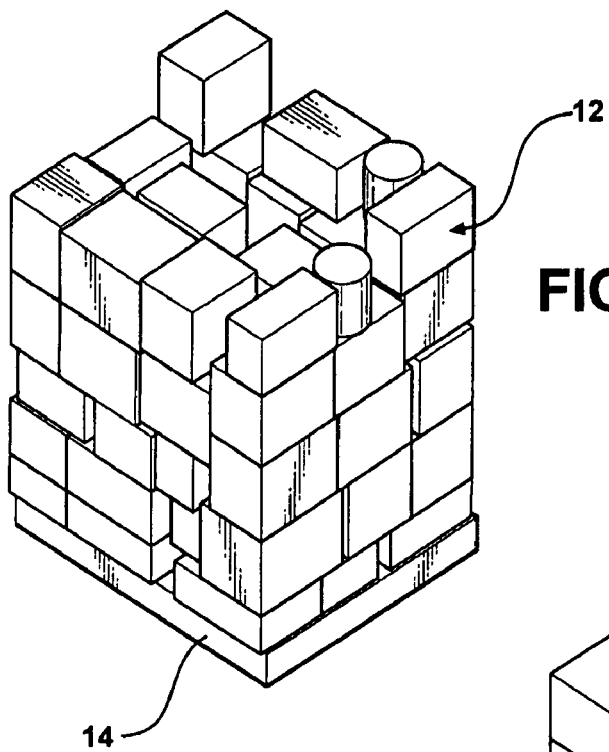
FIGS. 9 through 11 illustrate various embodiments of the pallets with differently palletized containers.
Figure 10:
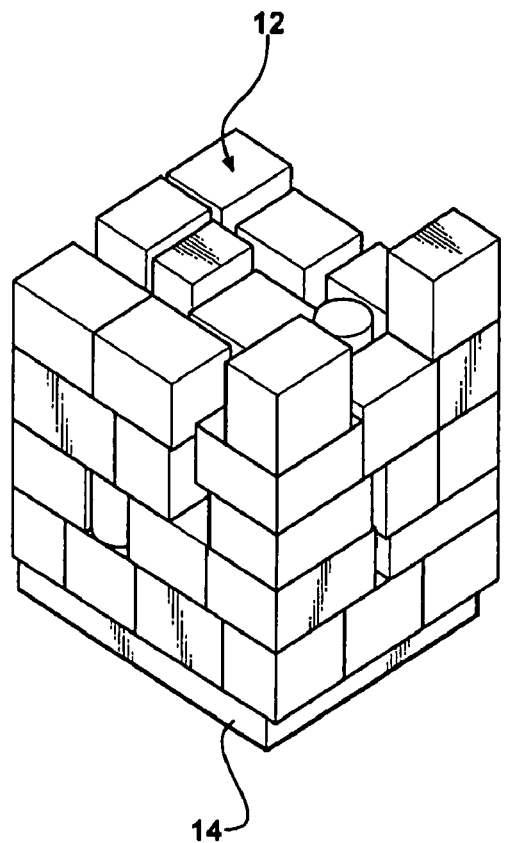
Figure 11:
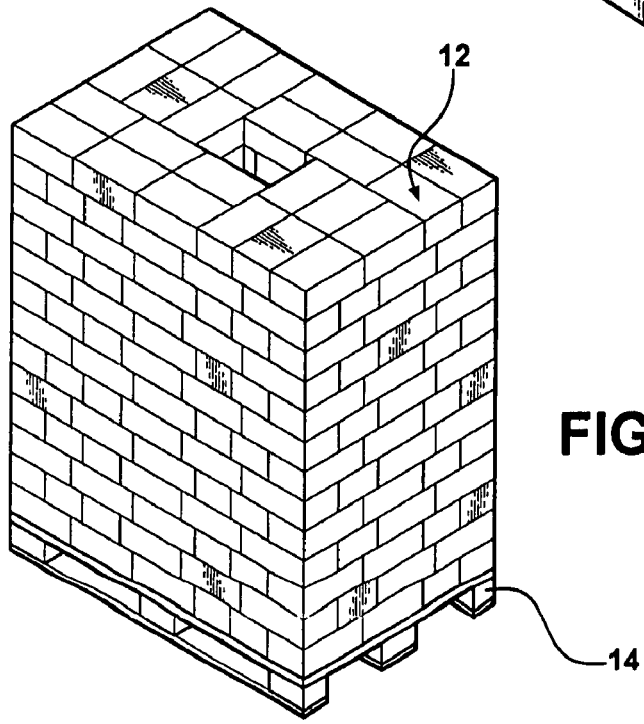

Alluding to the above, the assembly conveyors 42 are at least partially cooperable with the accumulation case conveyors 22 and 24, respectively. The zones 25, each zone 25 are further defined by at least one dual zone 50 and at least one triple zone 52 for moving at least two containers 12 from the accumulating conveyor 22 to the assembly conveyor 42. Each zone 25 is further defined by a frame 54 and a pusher surface 56 cooperable with the frame 54 and movable from an isolated position as the container 12 is receive in the zone 25 to a container engaging position as the pusher surface 56 moves the container 12 from the at least one accumulating conveyor 22 and 24 to the assembly conveyor 42, as shown by an arrow in FIG. 1. The type of the pusher surface 56, described herein, is not intended to limit the scope of the present invention The assembly conveyor 42 is accessible to a robotic device, such as articulating or gantry robot, generally shown at 60 in FIG. 1, as required by the customer and based on type of the application, to be pick-up by the robotic device 60 and placed upon a selected pallet 14. The containers are handled by a robotic tool shown at 62 in FIG. 8. As shown in FIGS. 4 and 8, the tool 62 is mounted upon a robotic manipulator 64 having an arm 66 adaptable for multi axial manipulation, such as, for example, an End of Arm Tool ("EOAT"), without limiting the scope of the present invention. In one embodiment, as shown in FIGS. 1 and 4, the robotic manipulator 64 is movable in multi-axial fashion between at least two or more locations, such as the pallets 14, the conveyor 42, and the like, with the robotic manipulator 64 position therebetween. The robotic manipulator 64 is programmable for compound and multi-axial movement for palletizing the at least one pallet 14 with the containers 12 received from the assembly conveyor 42 in at least one of random and selective mode thereby placing initial container 12 at any point within the pallet 14, as shown in FIGS. 1 and 4, and filling the pallet 14 by building layers and stacks of the containers 12 in a predetermined fashion, as shown in FIGS. 9 through 11, as the containers 12 are continuously received in the zones 25 and moved from the zones 25 to the assembly conveyor 42.

Numerous other elements of the inventive system 10 include and are not limited to a banding system, schematically shown at 70 in FIG. 1, which bands every layer of the containers 12 resting upon the pallet 14 as the pallet 14 is loaded by the robotic manipulator 64 with the containers 12 and/or a stretch wrapping device, schematically shown at 72 in FIG. 1, which wraps every layer of the containers 12, already band, that rest upon the pallet 14 as the pallet 14 is loaded by the robotic manipulator 64.

As the customer supplies order information, such as quantity and type of the products, this information is stored in a Robotictar® cell 80 operatively communicated with the controller 18. An empty pallet 14 is dispensed by a pallet dispenser (not shown) and transferred through pallet conveyors into a semi-automatic palletizing tower 74. The empty pallet 14 is elevated upwardly and is orientated in front of the inventive system 10 ready to receive the containers 12. The containers may be supplied in a random mode and/or a selected mode through a conveyance system diverting into several conveyor lanes, i.e. the accumulation case and buffer conveyors 22 and 24. The bar code reader, which is mounted on the accumulation case conveyor, reads, checks, where necessary it rejects non-conformed containers and the containers having the bar code, which the bar code reader failed to read and/or scan.

The conforming containers 12 are conveyed to the palletizing zone 44. The vision system 26 checks the top and lengths, widths height of the containers 12 as they are conveyed therethrough. The vision system 26 checks the containers 12 for inconsistency of any major top flaps detected lower than ¼, as set forth above. Again, as mentioned above, the vision system 26 also checks for any inconsistency of top "open" case flaps and case detection thereby identifying leaking and broken bottles, by means of weight detection, performed at the check weigher 36. All inconsistent containers 12 are either conveyed or rejected to the adjacent case conveyor 40. A warning light indicates to operator if the conveyor 40 is full with the inconsistent containers 12 and it will require to be fed the cases onto a buffering indexing conveyor (not shown). The indexing of the reject containers 12 is a manual operation and manually palletized after completion of an order If the rejection conveyor line reaches full capacity, an alarm is given and the cell stops at completion of current pallet to manual processing of reject case.

The conforming containers 12 are then conveyed toward the assembly conveyor 42 and a signal is sent the robotic manipulator 64, such as for example the Allen Bradley PLC for communicating to a coordinator case identity and positioning for picking. The containers 12 are then picked up by the robotic manipulator 64. Based on application requirement and as each customer desires, the controller 18 includes a software with an algorism with a custom designed program to allow the robotic manipulator 64 to randomly place the picked up container 12 onto the target pallet 14 as per program demand and calculated pattern. Once the order pallet height is reached or order is complete, the separate additional software coordinator sends the picked order to a license printer (not shown) of the controller 18 that passes this information to the labeler (this includes lost/error case information).

The banding system or integrated stretch wrap system 70 applies a horizontal band on each completed layer of containers 12. After the last strap or stretch band is on the pallet the pallet is then lowered by the automatic tower elevator 74, either provided at the customer's location or integrated into the system 10, and then the full mixed pallet is discharged on to the pallet conveyor, which is also integrated into the entire system 10. The full pallet 14 is then conveyed for the fork lift operator (not shown) to pick up of the full pallet 14. During this operation the supplied printer prints the license plate with the signal and order given from the controller 18 to the labeler either automatically and/or the fork lift operator then places the label onto the pallet 14 and then picks up the full pallet 14 from the pallet conveyor and moves the full pallet 14 to the designated drop off location. This operation starts over for the next pallet 14, either same or new order, as per demand.

As the vision system 26 device detects length, width, height and weight of the containers 12 and the bar code scanner 20 reads the barcode of each container 12, which contain Brand Number, Store Order Station Number, Batch Toggle, and the like, the controller 18 performs a consistency check between measured container dimensions and the brand information table, provided by the customer, to prevent damaged and/or incomplete containers 12 from being palletized. The controller 18 detects the end of an order via the Batch Toggle switch, it will block incoming containers 12 of the following order before the buffer entrance.

In summary and according to the given current index buffer content, which includes and is not limited to case length, width, height, weight and brand number, the system 10 selects one of the containers 12 and calculates an ideal drop position on the pallet 14. This target position includes several approach points (3-4 path points) near to the target position in order to avoid robot collisions. Pallet changes (i.e. pallet removals and pallet insertions) are processed as well. If no cases can be placed on the current pallet, the controller is notified to stop palletizing operations and wait until a new pallet has been placed.

The vision system, the controller 18, and the robotic manipulator 64 having the arm 66 are the core module elements of the system 10 and is adaptable to perform the following operation for proper palletizing. The operations include and are not limited to scanning barcode for incoming containers at the store accumulation lane, detecting dimensions of incoming containers 12, keeping track of the current random index buffer content, passing pick and drop coordinates to robot control, synchronizing the movement of the robotic device and the conveyors 22, 24, and 42, discharging full pallets to accumulation conveyor and/or moving the tower lift down z-Axis as required and according to maximum Z-Axis value, notifying successful placements and pallet changes, visualizing and storing of cell parameters like pallet dimensions, buffering coordinates, reporting containers 12 that could not be palletized, detect end of order via Batch Toggle switch, handling failure situations, such as, for example, detecting and handle robot collisions inside buffer or above the pallet 14, detecting and handling lost containers 12 and gripper failures, notifying failure information for appropriate model updating.

The incoming sequence of the containers 12 into the random buffer of the system 10 determines the pallet loading result, i.e. filling degree and stability. Therefore, an incoming sequence will improve the pallet loading results. For the final stage of automation a case sequencing module is intended to interact with a system at the customer's location. Scheduled during any time of the day, the case sequencing module processes the order data of the next day and the current Brand Information Table. In return, an optimal incoming sequence is designated for each order. When the order is finally processed, the system passes this sequence a case sortation system. Finally, the case sortation system diverts the cases to the system 10 in the appropriate sequence. Incoming sequences is handled by Auto Palletizing Unit (APU) of the system 10 as well.

The "Order Picking" comes with a standard Human Machine Interface (HMI), which provides all necessary functions to control and run the system 10. The HMI receives information from the controller 18 indicating the system status (i.e. conveyor running/stopped, faults). The HMI provides manual controls over the conveyors 22, 24, 40, and 42 and the existing tower 74. The bar code scanner 20 sends information as to which SKU is present at the flap detections to the controller 18 so it can determine the parameters for the correct container dimensions and weight. Another bar code scanner reads which container 12 is being presented to the Gantry & Algorism Program to be placed on the pallet 14. The vision system 26 sends the dimensions of the container 12 that is present at the vision station and the controller 18 determines if the container 12 passes or fails.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for filling, on a pallet, an order for a plurality of goods packed in containers having various configurations and sizes from a product supply source, comprising the steps of:

receiving, at a controller, the order for the goods;

placing containers required to fill the order onto an accumulating path leading from the product supply source to a palletizing position;

identifying each container placed on the accumulating path, by reading a barcode on the container, using a bar code reader associated with the controller, and removing from the accumulating path, if necessary, any container not bearing a barcode associated with the order;

verifying that each identified container on the accumulating path conforms with length, width, height and weight parameters associated with the barcode in a memory accessible to the controller, using sensors associated with the controller, and removing from the accumulating path any non-conforming containers;

determining, using an algorithm associated with the controller, a position and orientation for palletizing in layers each of the containers required to fill the order;

receiving each identified and conforming container at the palletizing position; and assembling the order on the pallet at the palletizing position, based upon the determined palletization orientation and position, using an articulating or gantry robot associated with the controller, the assembling step comprising the substeps of:

recognizing the received identified and conforming container; and placing each recognized container, either onto a layer of the pallet being assembled, or into one of a plurality of buffer zones, each buffer zone associated with identified and conforming containers of a single type; and placing, as needed, a container from one of the buffer zones onto the layer of the pallet being assembled.

2. The method of claim 1, wherein:
the step of assembling the order on the pallet further comprises the substep of determining dynamically in the controller a sequence in which the containers are to be palletized.

3. The method of claim 1, wherein:
the step of identifying each container comprises scanning the container to identify SKU and type of product contained therein.

4. The method of claim 1, wherein:
the step of verifying that each container conforms comprises the substep of measuring the length, the width, and the height of the container to determine if the container is open.

5. The method of claim 1, wherein:
the step of verifying that each container conforms comprises the substep of checking the weight of the container to determine if the container is broken.

* * * * *